Patented Oct. 11, 1932

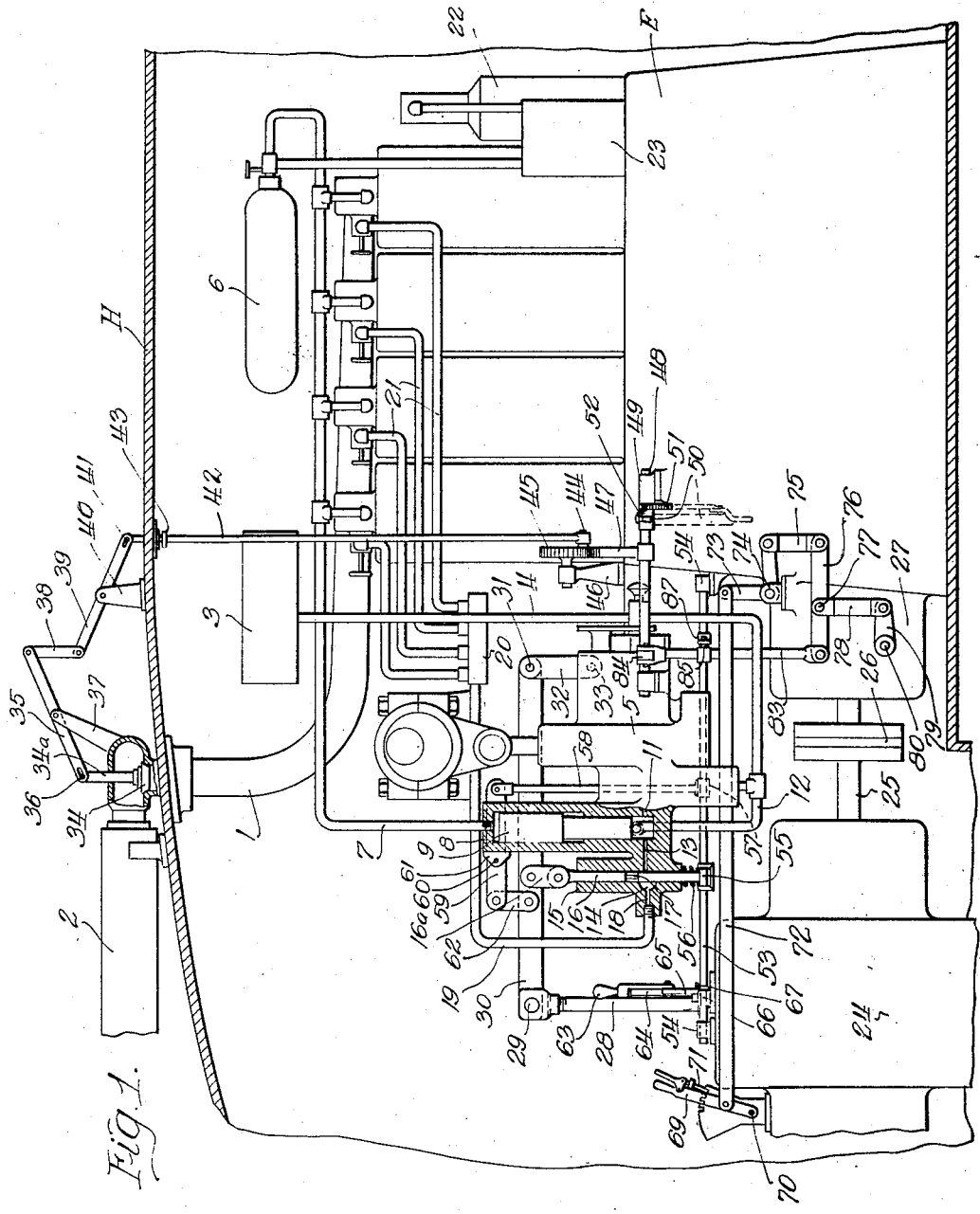

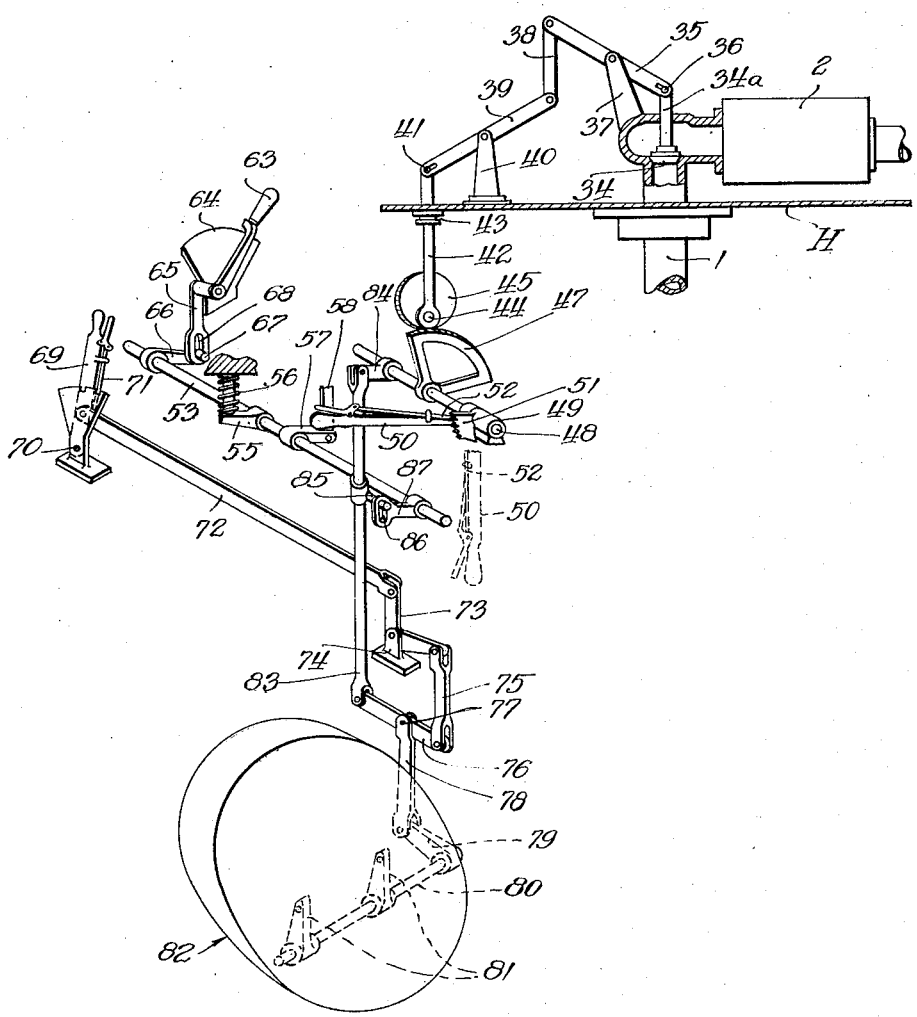

1,881,876

UNITED STATES PATENT OFFICE

ERNEST NIBBS, OF NEW LONDON, CONNECTICUT, ASSIGNOR TO ELECTRIC BOAT COMPANY, OF GROTON, CONNECTICUT, A CORPORATION OF NEW JERSEY

DISCONNECTING GEAR

Application filed January 12, 1931. Serial No. 508,152.

This invention relates to submarine boats, and has to do more particularly with means for cutting off or disconnecting the main or surface power plant prior to submergence.

In a submarine boat, it is necessary under present practice to close off the exhaust system before submergence in order to prevent water having access to the engine, and it is customary to have one or more valves fitted to each outlet from the main propelling engines. The procedure for diving, in accordance with present practice, is to first stop the engine and then close the exhaust outlet, and then disconnect the engine from the propeller, after which the submerged power plant can be safely utilized for under water propulsion. In order to provide for emergency diving, as for instance submerging to avoid being struck by a surface vessel, the nearest attendant on watch will close the outboard exhaust valve, but unless another attendant simultaneously stops the engine it will continue firing with the result that the exhaust gases, being denied exit, will raise the pressure in the now closed exhaust system and such gases will find their way into the interior of the vessel. This is highly objectionable for obvious reasons.

In order to keep the boat under control, it is highly important that the propellers may be driven by the submerged power plant immediately upon the surface power plant becoming inoperative. Under the present practice, the closing of the exhaust valve, the stopping of the engine, and the disconnecting of the engine from the propellers require three separate and distinct operations. In case of an emergency, as when it becomes necessary to dive to avoid being struck by a surface vessel, there is no assurance that these operations will be performed with sufficient rapidity and in proper order to avoid disaster.

One of the main objects of my invention is to provide means whereby the engine may be stopped, the exhaust pipe valve closed, and the engine disconnected from the propeller in proper order and with great rapidity. A further object is to provide disconnecting gear whereby these operations may be performed in proper sequence and by means of a single main control lever. In this manner I assure that the boat can dive or submerge upon an instant's notice and that the submerged power plant can be put into operation immediately upon disabling of the main or surface power plant, so that the boat remains under proper control. This is highly important as enabling diving or submergence upon short notice and assuring safety of the personnel of the boat. A further object of my invention is to provide a disconnecting gear of the character stated which under normal conditions does not in any way interfere with the operation of the fuel supply and control system, or the clutch for clutching the engine to and declutching it from the propeller shaft. Further objects and advantages of my invention will appear from the detailed description.

In the drawings:

Figure 1 is a side view of an internal combustion engine and associated parts for propelling a submarine boat, illustrating a disconnecting gear in accordance with my invention as applied, parts being shown in section and the hull of the boat being shown fragmentarily and in section;

Figure 2 is a semi-diagrammatic perspective view of the disconnecting gear of my invention.

I have illustrated my invention as applied to a Diesel engine E disposed within the hull H of a submarine boat. An exhaust pipe 1 extends from this engine through the hull H, opening exteriorly thereof, this pipe discharging into a muffler 2 of suitable type. Fuel oil is supplied to the cylinders of the engine from a tank 3 which is connected by a pipe 4 to an oil pump 5 driven from the engine in a suitable manner. An air flask 6 is suitably connected to the engine cylinders or, more correctly, to the injection nozzles for injecting oil into the cylinders, and air from this flask is supplied, by a pipe 7, to the upper end of a cylinder 8 in which operates a floating piston 9. Oil under pressure is supplied to cylinder 8, beneath piston 9, from pump 5, through a port 11. A pipe 12, forming an extension of pipe 4, opens into cylinder 8 a short distance above port 11. The space beneath piston 9 communicates, by means of a duct 13 with a chamber 14 of a valve casing 15 in which operates a fuel control valve 16, this valve being of elongated cylindrical shape and having a cutaway portion 17 intermediate its ends. Chamber 14 communicates, by means of an outlet duct 18, with a tube 19 opening into a manifold 20 from which extend tubes 21 for supplying oil to the injection nozzles of the cylinders of the engine. In the normal operation of the engine, the cutaway portion 17 of valve 16 is disposed in alignment with duct 13 so that oil under pressure from the pump and the lower portion of cylinder 8, is supplied to chamber 14 and flows through tube 19 to the manifold 20. Air is supplied to flask 6 under constant pressure by means of a suitable air compressor 22, and through a cooling device 23. If the pressure of the oil in the lower portion of cylinder 8 rises above that of the air above piston 9, the upper end of pipe 12 is uncovered and a portion of the oil is by-passed back to the pump, thus reducing the oil pressure. If the oil pressure beneath the piston drops below that of the air above the piston, the upper end of pipe 12 is closed and the oil pressure is built up until equilibrium is again established. This assures supply of oil to the engine under constant pressure.

The valve 16 provides means for controlling the speed of operation of the engine by regulating the fuel fed thereto. In order to prevent racing of the engine or operation thereof at a greater speed than that for which the valve 16 is set, a centrifugal governor of suitable type is provided and is connected to the valve 16 for automatically operating the same. The centrifugal governor employed is preferably similar to that disclosed in the patent to Gregory C. Davison for fuel supply system for internal combustion engines, issued August 7, 1917, No. 1,236,060. This patent also discloses the fuel supply system above briefly described. The centrifugal governor is enclosed in a suitable casing and is designated 24. This governor is suitably connected to a propeller shaft 25 driven by the engine E, this shaft having interposed therein a suitable coupling 26. The engine has associated therewith a clutch 27 of known type for clutching the engine to and declutching it from the shaft 25. A rod 28 is suitably connected, at its lower end, to the governor 24 so as to be raised and lowered thereby in accordance with increase and decrease in speed of rotation of shaft 25. The upper end of this rod is pivotally connected, at 29, to one end of a floating lever 30 the other end of which is pivoted at 31 to the upper end of a link 32 pivoted at 33 to the pump structure. The upper end of valve 16 is connected by a short link 16ª to floating link 30. If desired, suitable means is provided for adjusting the link 32 vertically, thus raising and lowering the floating lever about pivot 29 so as to provide manual control of valve 16. This is known in the art and is disclosed in the above identified patent to Davison, and need not be further illustrated nor described here. The centrifugal governor coacts with rod 28 and the floating lever 30 to actuate valve 16 in such manner as to regulate the supply of fuel to the engine in accordance with the desired engine speed, thus preventing racing of the engine or operation thereof at a greater speed than that for which the valve is initiallly set. This control means and the operation thereof are disclosed in more detail in the patent above identified and need not be further illustrated nor described here, it being sufficient to note that suitable means is provided for actuating the fuel control valve in accordance with variations in speed of rotation of the shaft 25.

A suitable valve 34 controls the exhaust pipe 1 for opening and closing the same. When operating on the surface, this valve is in open position so that the products of combustion from engine E escape through exhaust pipe 1. Prior to submergence, the valve 34 is closed. The provision of such a valve is known in the art. A lever 35 is connected at one end, by pin and slot connections 36, to the upper end of stem 34ª of valve 34. This lever is pivoted intermediate its ends upon a suitable bracket 37 conveniently secured to or formed integral with the outer portion of pipe 1. At its other end the lever 35 is connected by a link 38 to one end of a lever 39 pivoted intermediate its ends upon a bracket 40 secured to the hull H of the boat. The other end of lever 39 is connected by pin and slot connections 41 to the upper end of a rod 42 slidable through a stuffing box 43 through which the rod projects outwardly of the hull. The lower end of this rod is pivoted to an eccentric pin 44 of a gear wheel 45 rotatably mounted in a bracket 46 suitably secured to the structure of engine E. A segmental rack 47 meshes with spur gear wheel 45. This rack is secured upon a main control shaft 48 rockably mounted in suitable bearing members 49 suitably secured to the engine structure. A main operating lever 50 is secured to shaft 48. By turning lever 50 in proper direction, the valve 34 may be opened or closed. It is noted that the levers 35 and 39 and associated parts possess appreciable resiliency so as to assure tight seating of valve 34 when closed while allowing for any slight inaccuracies in assembly or construction. When the valve 34 is closed, the lever 50 is disposed substantially horizontally and extends away from the engine E. For holding the lever in adjustment, I provide a suitable rack 51 disposed concentric with shaft 48, with which rack cooperates a detent 52 carried by the lever and operated in a known manner. In order to open the valve 34, the lever 50 is moved downwardly through an arc of approximately 90° into substantially vertical position. This serves to turn the gear wheel 45 through an arc of approximately 180° so as to raise the eccentric pin 44 thus opening the valve 34 by means of rod 42 and the parts associated therewith.

A fuel control shaft 53 is rockably mounted in parallel relation to shaft 48, in suitable bearing members 54 secured to the engine structure and to the governor 24. A finger 55 is secured to this shaft and extends laterally thereof beneath the fuel control valve 16. An expansion coil spring 56 is mounted about the lower portion of this valve and is confined between finger 55 and the lower end of valve casing 15. An arm 57 is secured upon shaft 53 and projects therefrom oppositely to finger 55. This arm is connected by a link 58 to a lever 59 pivoted intermediate its ends, at 60, upon a bracket 61, the other end of this lever being connected by a link 62 to floating lever 30 at a point between link 16ᵃ and rod 28. This provides a connection between shaft 53 and floating lever 30 such that, when the shaft 53 is rocked in a clockwise direction as considered in Figure 2, a lifting effect will be exerted upon lever 30 for raising the valve 16, this effect being supplemented by the pressure of finger 55 upon the lower end of the valve. A fuel control lever 63 is mounted for turning movement adjacent a cooperating segment 64 and this lever is connected by a link 65 to an arm 66 secured to shaft 53, this arm having a pin 67 extending through a slot 68 in link 65. With the lever 63 in the position shown in Figure 2, the shaft 53 is in running position so that the valve 16 can be operated in the manner previously described. It will be noted that the slot 68 and the pin 67 provide a lost motion connection between the shaft 53 and lever 63 which permits of rocking movement of shaft 53 independently of lever 63 and in a direction to open valve 16, this valve being closed in the position of shaft 53 illustrated in Figure 2.

A clutch lever 69 is suitably mounted on a cooperating segment 70 having spaced notches for reception of a suitable detent 71 carried by the lever. This lever is connected by a link 72 to one arm of a bell crank 73 rockably mounted in a bracket 74. The other arm of this bell crank is connected by a link 75 to a lever 76 pivotally secured intermediate its ends, at 77, to the upper end of a link 78. The lower end of link 78 is pivoted to an arm 79 secured to a clutch shaft 80 rockably mounted in a suitable manner and provided with fingers 81 which coact with the discs of a clutch 82 of known type so as to declutch the engine from the shaft 25 upon turning of shaft 80 in a clockwise direction, as considered in Figure 2, in a known manner. The other end of lever 76 is connected to the lower end of a rod 83 pivoted thereto, the upper end of this rod being pivoted to an arm 84 secured upon the main control shaft 48. A finger 85 is secured to rod 83 and projects through a slot 86 in an arm 87 secured upon shaft 53. When the valve 34 is closed shaft 53 is turned in such direction as to raise the valve 16 into closed position thus cutting off supply of fuel to the engine and stopping the same. This operation occurs regardless of the position of the control lever 63, due to the pin and slot connection between link 65 and arm 66. Furthermore, finger 85 coacts with arm 87 to hold shaft 53 in fuel valve closing position so long as the valve 34 is closed.

Rocking of shaft 48 into position to close the valve 34 serves to raise rod 83 which acts through lever 76 and link 78 to turn shaft 80 in clutch releasing direction, thus declutching shaft 25 from the engine. This operation occurs even though the lever 69 be in its forward or clutch applying direction, since this lever is locked to its associated segment and the lever 76 is fulcrumed, at such time, at the lower end of link 75.

It is not essential that the arm 57 and the associated linkage connection between the same and the floating lever 30 be provided at all times and such arm and linkage may be omitted in certain cases if desired. Since the finger 55 bears against the lower end of valve 16, rocking movement of shaft 53 in a clockwise direction as considered in Figure 2 serves to raise the valve 16 into position to close the duct 13 and cut off the supply of fuel to the engine. This valve may, therefore, be operated directly by the finger 55, though under ordinary conditions I preferably provide the arm 57 and associated linkage for rocking the lever 30 in valve raising direction so as to relieve the valve of stresses incident to raising of this lever which might tend to interfere with accuracy of operation of the valve.

It will be apparent, from the foregoing, that by turning the lever 50 in a clockwise direction, as considered in Figure 2, from a downwardly extending into a substantially horizontal position, the valve 34 is closed, the supply of fuel to the engine is cut off and the shaft 25 is declutched from the engine. These three operations occur simultaneously, or substantially so, and are all accomplished by the movement of the single lever 50. This serves to immediately disable the main or surface power plant and to disconnect it from the propeller shaft so that the submerged power plant can be thrown into operation immediately thus keeping the boat under control. If desired, the various parts may be so timed that the supply of fuel to the engine is cut off slightly in advance of closing of the valve 34, after which the shaft 25 is declutched from the engine. It will be obvious, therefore, that simultaneous operation of the clutch and the fuel control valve and the exhaust outlet air valve is not essential, it being sufficient that these various members operate approximately simultaneously or sufficiently nearly close together to permit of cutting out the main power plant and promptly putting into operation the submerged power plant.

Under normal conditions, when the boat is operating on the surface, the main power plant, which may comprise one or more internal combustion engines, is utilized. The valve (or valves) 34 is opened when the main control lever 50 is disposed downwardly and in substantially vertical position. At such time, the rod 83 is lowered and shaft 53 may be turned under the influence of spring 56 into position to lower the fuel control valve 16 for uncovering the duct 13. By swinging the fuel control lever 63 into its extreme position to the left, as considered in Figure 2, shaft 53 may be turned in a clockwise direction for raising valve 16 and cutting off supply of fuel to the engine. Also, with the rod 83 in lowered position, the clutch may be operated by lever 69 for clutching the shaft 25 to and declutching it from the engine. It will thus be seen that the disconnecting gear of my invention, under normal conditions, in no way interferes with the control and operation of the engine and the associated clutch means. On the other hand, when it is desired to dive or submerge, it is only necessary to throw the lever 50 to operative position to stop the engine, close the exhaust pipe and declutch the engine from the propeller shaft. This can be accomplished practically instantaneously, and the submerged power plant can be thrown into operation at once, thus rendering it possible and safe to dive on extremely short notice.

As above indicated, and as will be apparent to those skilled in the art, changes in construction and arrangement of parts of my invention may be resorted to without departing from the field and scope of the same, and I intend to include all such variations, as fall within the scope of the appended claims, in this application in which the preferred form only of my invention is disclosed.

What I claim is:

1. In combination in a submarine boat, an internal combustion engine within the hull, an exhaust pipe for the engine opening exteriorly of the hull, a shaft driven by the engine, means for supplying fuel to the engine, a valve controlling said pipe, clutch means for clutching the engine to and declutching it from said shaft, and control means for simultaneously closing said valve, cutting off the supply of fuel to the engine and declutching the engine from said shaft.

2. In combination in a submarine boat, an internal combustion engine within the hull, an exhaust pipe for the engine opening exteriorly of the hull, a shaft driven by the engine, means for supplying fuel to the engine, a valve controlling said pipe, clutch means for clutching the engine to and declutching it from said shaft, and control means for simultaneously closing said valve, cutting off the supply of fuel to the engine and declutching the engine from said shaft, said control means including lost motion connections permitting operation of the clutch means independently of the valve when said valve is open.

3. In combination in a submarine boat, an internal combustion engine within the hull, an exhaust pipe for the engine opening exteriorly of the hull, a shaft driven by the engine, means for supplying fuel to the engine and including a fuel supply control valve, a valve controlling said pipe, clutch means for clutching the engine to and declutching it from said shaft, and control means for simultaneously closing both valves and declutching the engine from said shaft.

4. In combination in a submarine boat, an internal combustion engine within the hull, an exhaust pipe for the engine opening exteriorly of the hull, a shaft driven by the engine, means for supplying fuel to the engine and including a fuel supply control valve, a valve controlling said pipe, clutch means for clutching the engine to and declutching it from said shaft, and control means for simultaneously closing both valves and declutching the engine from said shaft, said control means including lost motion connections permitting operation of the clutch means and the fuel supply control valve independently of the exhaust pipe valve when the latter is open.

5. In combination in a submarine boat, an internal combustion engine within the hull, an exhaust pipe for the engine opening exteriorly of the hull, a shaft driven by the engine, means for supplying fuel to the engine and including a fuel supply control valve, a valve controlling said pipe, clutch means for clutching the engine to and declutching it from said shaft, governor means for automatically adjusting the fuel supply control valve in accordance with variations in engine speed, and control means for simultaneously closing both valves and declutching the engine from said shaft, said control means including lost motion connections permitting operation of the fuel control valve by said governor means and operation of the clutch means, independently of the exhaust pipe valve when the latter is open.

6. In combination in a submarine boat, an internal combustion engine within the hull, an exhaust pipe for the engine opening exteriorly of the hull, a shaft driven by the engine, a normally open valve controlling said pipe, means normally operative for clutching and declutching the engine to and from the shaft, means normally operative to automatically regulate the supply of fuel to the engine in accordance with variations in engine speed, and means supplemental to and cooperating with the clutching and declutching means and the regulating means for simultaneously closing said valve and declutching the engine from the shaft and cutting off the supply of fuel to the engine.

7. In combination in a submarine boat, an internal combustion engine within the hull, an exhaust pipe for the engine opening exteriorly of the hull, a normally open valve controlling said pipe, a shaft driven by the engine, clutch means for clutching the engine to and declutching it from said shaft, a clutch lever having operating connection to the clutch means, means for automatically governing the feed of fuel to the engine in accordance with variations in speed of rotation of said shaft, means supplemental to the automatic means for manually regulating the feed of fuel to the engine independently of said automatic means, a main control lever, operating connections between the main control lever and the valve for opening and closing the latter, and means interconnecting said main control lever and the manual and automatic fuel controls and the connections between the clutch lever and the clutch means, said interconnecting means acting to declutch the engine from the shaft and to cut off the supply of fuel to the engine when the main control lever is operated to close said valve, the interconnecting means including lost motion connections permitting independent operation of the clutch means and the automatic and manual means for controlling feed of fuel to the engine, when said valve is in open position.

8. In combination in a submarine boat, an internal combustion engine within the hull, an exhaust pipe for the engine opening exteriorly of the hull, a normally open valve controlling said pipe, a shaft driven by the engine, a clutch for clutching the engine to and declutching it from said shaft, a clutch shaft and associated parts for operating the clutch, a clutch lever, a bell crank, a link connecting one arm of the bell crank to said lever, operating connections between the other arm of the bell crank and the shaft and including a second link pivotally connected intermediate its ends to said shaft and having one end pivotally connected to said other arm of the bell crank, a rod pivoted to the other end of said second link, a rockably mounted main control shaft, operating connections between the control shaft and the valve for closing and opening the latter, means including a fuel control valve for automatically controlling supply of fuel to the engine in accordance with variations in speed of rotation of said shaft, a rockably mounted fuel control shaft, means for closing the fuel valve upon movement of said fuel control shaft in one direction, a connection between the main control shaft and said rod for moving the latter in clutch releasing direction upon movement of the main control shaft in valve closing direction, and a lost motion connection between said rod and the fuel control shaft for moving the latter in fuel valve closing direction upon movement of the rod in clutch releasing direction, said lost motion connection permitting rocking movement of the fuel control shaft independently of said rod when the exhaust pipe valve is open.

9. In combination in a submarine boat, an internal combustion engine within the hull, means for supplying fuel to the engine, a normally open exhaust pipe for the engine opening exteriorly of the hull, a shaft to be driven by the engine, clutch means for clutching and declutching the engine to and from said shaft, an operating lever, and means actuated by said lever for cutting off the supply of fuel to the engine, closing the exhaust pipe and declutching the engine from the shaft.

10. In combination in a submarine boat, an internal combustion engine within the hull, means for supplying fuel to the engine, a normally open exhaust pipe for the engine opening exteriorly of the hull, a shaft to be driven by the engine, clutch means for clutching and declutching the engine to and from said shaft, and control means for cutting off the supply of fuel to the engine, closing the exhaust pipe and declutching the engine from the shaft in predetermined and timed relation.

11. In combination in a submarine boat, an internal combustion engine within the hull, an exhaust pipe for the engine opening exteriorly of the hull, a shaft driven by the engine, means for supplying fuel to the engine and including a fuel supply control valve, a valve controlling said pipe, clutch means for clutching the engine to and declutching it from said shaft, and control means for closing both valves and declutching the engine from said shaft in predetermined and timed relation.

In witness whereof, I hereunto subscribe my name this 26th day of December, 1930.

ERNEST NIBBS.